United States Patent [19]

Johnston

[11] 3,903,747
[45] Sept. 9, 1975

[54] VIBRATING WIRE ATTITUDE REFERENCE SENSING SYSTEM

[75] Inventor: James H. Johnston, Rehoboth, Mass.

[73] Assignee: The United States of America as represented by the Secretary of the Navy, Washington, D.C.

[22] Filed: May 16, 1974

[21] Appl. No.: 470,471

[52] U.S. Cl............................... 73/505; 73/505
[51] Int. Cl.² ..................................... G01C 19/56
[58] Field of Search ..................... 73/505, 517 AV

[56] References Cited
UNITED STATES PATENTS

| | | | |
|---|---|---|---|
| 2,479,562 | 8/1949 | Ferrill | 73/505 X |
| 3,106,847 | 10/1963 | Mullins | 73/505 |
| 3,349,628 | 10/1967 | Quick | 73/505 |
| 3,515,003 | 6/1970 | Taylor | 73/505 |

*Primary Examiner*—James J. Gill
*Attorney, Agent, or Firm*—Richard S. Sciascia; Arthur A. McGill; Prithvi C. Lall

[57] ABSTRACT

A vibrating wire attitude reference sensing system utilizes a uniquely vibrated wire kept in constant motion and whose plane of vibration is rotated a predetermined small amount in an oscillatory fashion. Sensing equipment monitors the change in angular position and transforms this information into pulses which perform two functions. A first function is to transmit the pulses to components that force the plane of vibration to a new angle. The other function is to transmit the pulses to equipment that counts records and determines the angle of rotation.

7 Claims, 2 Drawing Figures

PATENTED SEP 9 1975                                    3,903,747

VIBRATING WIRE ATTITUDE REFERENCE SENSING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to navigation systems and more particularly to an integrating rate attitude sensor of inertial grade quality capable of precision navigation in conjunction with accelerometers when used in a strapdown guidance and navigation mode.

Prior art rate attitude sensors adapted for use in the strapdown mode require gyro wheels, spin motor drive and torque rebalancing. These systems are inherently costly due to precision requirements of many piece-parts, and are variable in quality. Prior to the present invention all other attitude sensing concepts, new or old, dealing with laser, electrostatic ball, fluidic, vibrating wire or non-integrating rate gyros are either undeveloped due to intrinsic problem such as gas contamination of lasers, or cannot even be considered due to inherent drift errors, without hope of cure.

SUMMARY OF THE INVENTION

Accordingly, it is a general purpose and object of the present invention to provide an improved integrating rate attitude sensor system. It is a further object that the system be low in cost while maintaining high precision. Other objects are that the system be used in a strapdown guidance and navigation mode, and that no components have severe tolerance requirements.

This is accomplished in accordance with the present invention by deliberately forcing a wire into a plane of vibration and which plane is forced into angular motion. The wire is driven by a plurality of electronically driven magnets. Sensors are located to detect the limits of this angular rotation. These sensors are configured to produce a digital pulse upon such tiny rotation. If plus at clock time, then the magnet force drives negative and vice versa. Thus when the gyro is at rest, the vibrational plane rotates alternately + and − to the minimum resolution angle, at the maximum angular rate, at the clock frequency. When the vibrating wire is rotated by the minimum angle in the − or + direction at whatever rate, the sensor misses a + or − motion and the magnet drive does not force the wire back sufficiently in the alternate direction. The pulses are counted and the excess number of + or − pulses are recorded as increments of angle in their respective direction, to be utilized in a strapdown guidance system.

DESCRIPTION OF THE PREFERRED EMBODIMENT

Figure 1:
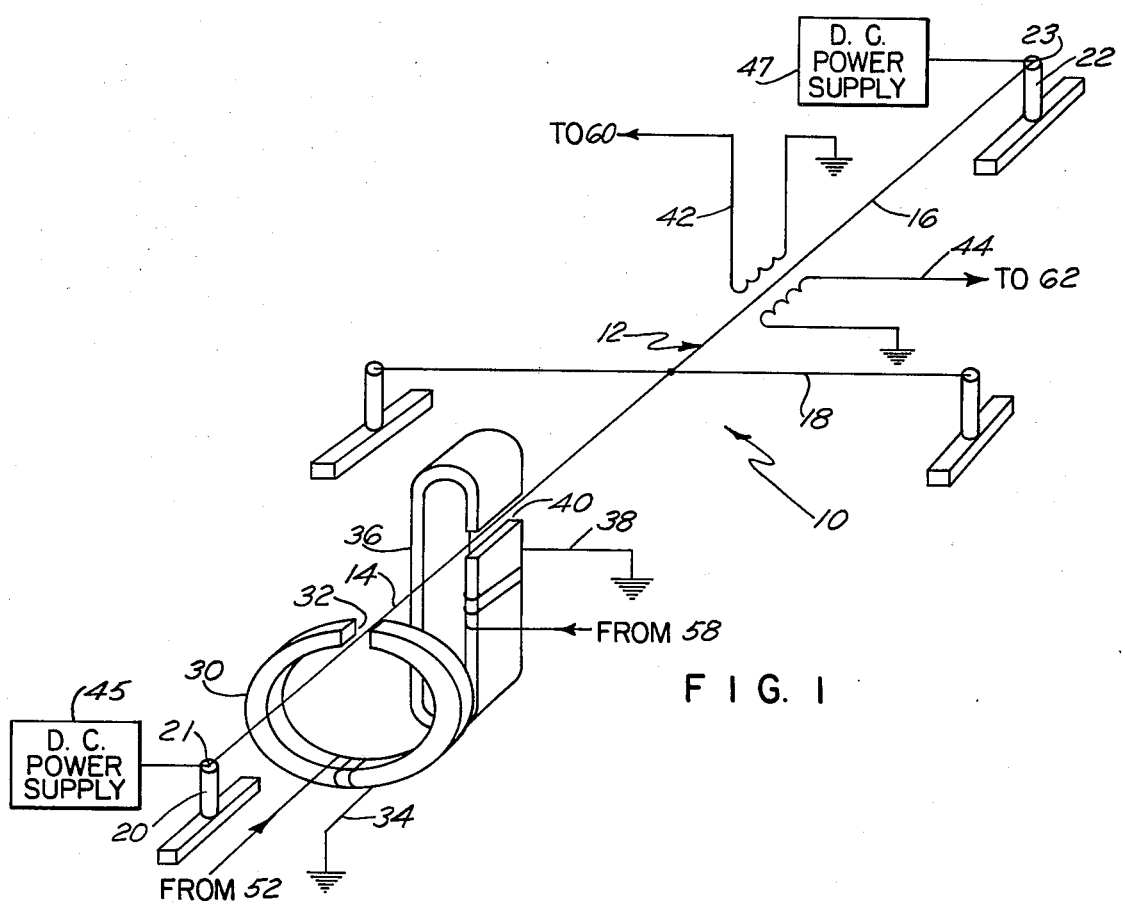
FIG. 1 is a diagrammatic representation of a vibrating wire system according to the present invention.

Referring now to the figures, and particularly to FIG. 1, there is shown a vibrating wire assembly 10. For simplicity only one such assembly 10 and associated components are shown. It is to be understood that in a typical system three such assemblies aligned mutually perpendicular to each other and having their own respective components would be utilized. The assembly has a vibrating wire 12 having first and second sections 14 and 16, respectively, on opposite sides of a tie down 18 that can be located at the center of wire 12. Tie down 18 functions as an electrical ground in addition to holding wire 14 mechanically in place. The opposite ends of wire 12 are respectively connected to tie downs 20 and 22. Both tie downs 20 and 22 must exhibit electrical insulating qualities as electrical current is supplied to sections 14 and 16 at their respective ends at respective points 21 and 23. First wire section 14 functions as the driving parts of wire 12 and second wire section 16 is used for sensing purposes. A d.c. signal is supplied to section 14 at point 21 on tie down 20 and to point 23 on section 16 at tie down 22. The ground at tie down 18 completes the electrical circuit for both sections 14 and 16.

A vibrating drive magnet 30 having a gap 32 is driven by an alternating electrical signal in a coil 34 that is wrapped around a portion of the magnet 30. Wire section 14 extends through gap 32 and vibrates in the vertical direction according to the well known right hand rule as the direction of the magnetic flux across gap 32 changes in correspondence to the electrical signal in coil 34.

A second magnet 36 termed a rotary oscillation drive magnet is positioned orthogonally to vibrating drive magnet 30. The magnet 36 has a coil 38 wrapped around it. The coil 38 is supplied with an electrical signal of a lower frequency than that supplied to coil 34. A gap 40 in magnet 36 has wire section 14 extending therethrough. On an electrical signal being applied to coil 38 the plane of vibration of wire section 14 is caused to rotate in an oscillatory fashion about the axis defined by tie downs 20, 18 and 22 at the frequency of the applied signal. Said applied signal is derived from appropriate power supplies and sensors which sense the angular rotation of the plane of vibration in a second wire section 16.

Second wire section 16 vibrates in response to the vibrations of section 14 by means of the bending moment in the wire 12 transferred through tie down 18. A pair of sensor coils 42 and 44 for proximity detection of current in wire section 16 are located at a spacing for detection of a 0.001° to 0.1° angular rotation of the plane of vibration of wire section 16.

Figure 2:
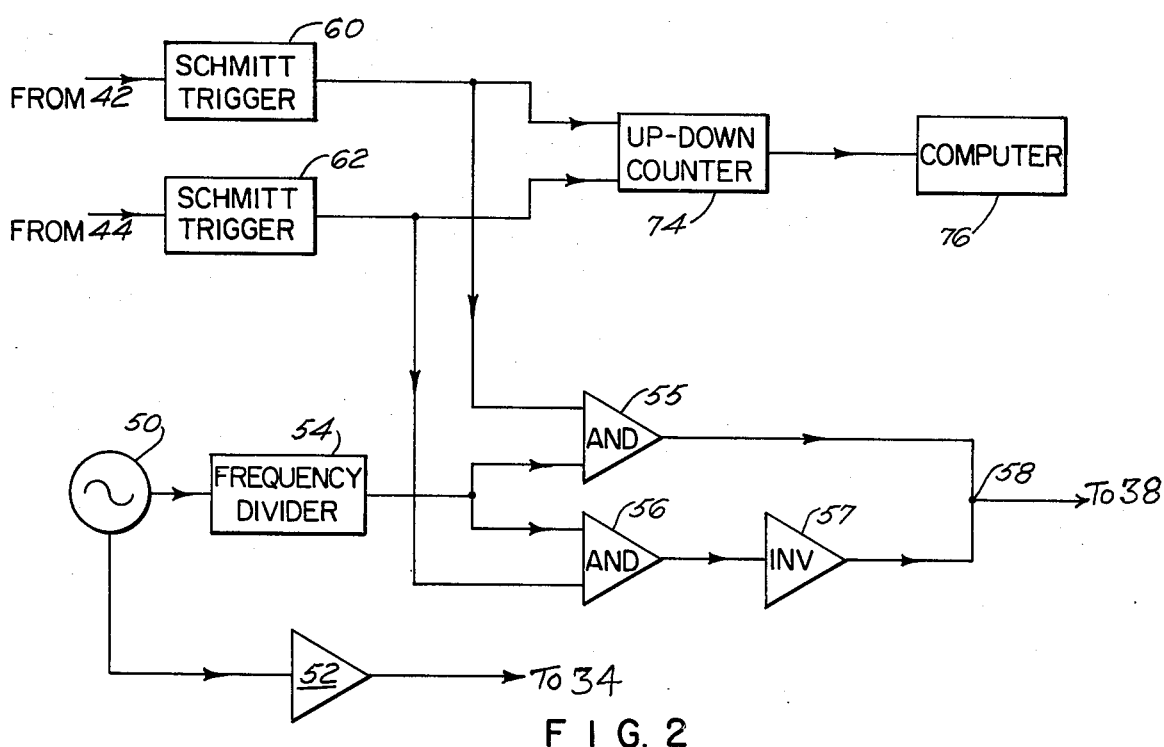
FIG. 2 is a block diagram of the sensing and controlling means utilized in the system of FIG. 1.

The following equipment as shown in FIGS. 1 and 2 is suitable for providing driving signals and sensor detection. A pair of d.c. power supplies 45 and 47 provide d.c. current in wire 12 by applying power at terminals 21 and 23. An alternating electrical signal emanating from oscillator 50 is used to create vibration in wire 14. To accomplish this, oscillator 50 supplies a fixed frequency signal to magnet coil 34 through power amplifier 52. In addition, oscillator 50 supplies a signal through frequency divider 54 and AND gates 55 and 56 to magnet coil 38 so as to create angular oscillation. AND gates 55 and 56 are also controlled by signals from sensors 42 and 44, thus causing the frequency of angular oscillation to be controlled by sensors 42 and 44.

The above components are selected so that drive magnet 30 not only supplies a higher frequency flux than magnet 36 but also supplies a higher field strength.

This higher field strength can be obtained in many ways such as more coils in coil 34 than coil 36, less reluctance in the combination of the drive magnet 30 and gap 32 than the rotary oscillation drive magnet 36 and gap 40, etc.

The following describes means of sensing and controlling the angular oscillation of the plane of vibration and in addition depicts means of detecting and utilizing the external acceleration forces applied to the system. Sensor coils 42 and 44 detect proximity of the wire 12 at their respective angular displacement and cause Schmitt triggers 60 and 62 to fire. The resultant frequency output from Schmitt triggers 62 and 60 are returned to AND gates 55 and 56 for control of the angular oscillation frequency. The output pulses of Schmitt triggers 60 and 62 are also counted as plus or minus pulses in up-down counter 74. Counter 74 is decoded and read by a computer 76. The computer 76 utilizes the sum of the pulses as received from counter 74 to derive the angular rate of the system. Computer mechanizations are well known in the art and can include direction cosine matrix systems which utilize 1st order reversible updating or Crowder-Hession updating or quaternion updating. In addition, the direct use of quaternions is feasible.

The operation of the device is described in the following manner. A d.c. signal is supplied to wire section 14 from d.c. power supply 45 and also to wire section 16 from d.c. power supply 47 and commoned at tie down point 18. A first alternating electrical signal is applied to drive magnet coil 34. This causes first wire section 14 to vibrate in a plane. A second electrical signal applied to rotary oscillation drive magnet coil 38 causes the plane of vibration of first wire section 14 to rotate in an oscillatory manner. If a cross-section of the wire motion were examined, a Lissajou pattern traced by the wire section 14 would be observed which pattern would rotate through a small angle at the frequency of the second electrical signal.

Wire section 16 follows the pattern traced by section 14 due to bending moments in the wire 12 at tie down 18. When the plane of vibration of wire section 16 approaches sensor 42 or 44, the appropriate signal is detected by the appropriate sensor coil. This signal is used to alter the frequency applied to coil 38 by means of AND gates 55 and 56. As long as the system remains stationary, an equal number of pulses will be generated by both sensor coils 42 and 44 at the driving frequency.

The signal from sensor 42 arriving at AND gate 55 simultaneously with the signal from frequency divider 54 tends to drive the plane of vibration toward sensor 44. The signal from sensor 44 arriving simultaneously with the signal from frequency divider 54 creates an inverted output due to inverter 57 and this tends to drive the plane of vibration back toward sensor 42.

However, if the body in which this system is mounted rotates, then the wire resists such rotation causing a larger number of pulses at the appropriate sensor 42 or 44. These pulses when summed with the basic frequency at AND gates 55 and 56 cause one of the AND gates 55 or 56 to have a larger number of output signals than the other. If for instance AND gate 55 has more outputs than AND gate 56 a larger number of positive pulses than negative pulses will be received by coil 38. This creates a biased oscillatory motion tending to realign the plane of angular oscillation equally between the sensors 42 and 44.

In addition, the unequal number of pulses from sensors 42 and 44 describes increments of angular rotation. These pulses of increment are counted and utilized within a computer to determine the total change in angle.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A vibrating wire attitude reference sensor comprising:

a wire;

driving means for driving said wire into a vibrating plane having an oscillatory motion of incremental angular rotations about a midposition;

control means for providing a plurality of signals to said driving means, said signals determine the direction of the incremental angular rotations so that the vibrating plane is forced to alternate on opposing sides of said mid-position; and sensing means for detecting the incremental angular rotations by detecting the position of the vibrating plane of said wire and for providing a feedback to said control means for controlling the oscillatory motion of incremental angular rotations and therefore define said mid-position and for providing information to be counted for measuring angle.

2. A vibrating wire attitude reference sensor according to claim 1 further comprising:

a first tie down, a second tie down and a third tie down connected to said wire respectively at one end, an intermediate point and the other end, said first and third tie downs being insulated from ground and said second tie down being grounded; and d.c. power supply means for supplying a d.c. current to said one and other ends of said wire.

3. A vibrating wire attitude reference sensor according to claim 2 wherein said driving means further comprises:

a first magnet having a gap with said wire extending through said gap;

a second magnet being disposed orthogonal to said first magnet, said second magnet having a gap with said wire extending through said gap; and first and second coils respectively surrounding portions of said first and second magnets.

4. A vibrating wire attitude reference sensor according to claim 3 wherein said sensing means further comprises:

a first and second sensor disposed between said second and third tie downs at right angles to the axis of said wire with said first and second sensors separated by a predetermined angle and said null position of the vibrating plane of said wire is located equi-distant between said first and second sensors;

measuring means connected to said first and second sensors for measuring changes in direction; and feedback means connected to said first and second sensors for providing said feedback.

5. A vibrating wire attitude reference sensor according to claim 4 wherein said control means further comprises:

an a.c. power supply connected to said first coil;

divider means connected to said a.c. power supply for reducing the frequency of said a.c. power supply means; and gating means connected to said divider means and said feedback means for controlling the signal applied to said second coil.

6. A vibrating wire attitude reference sensor comprising:

a wire;

a first tie down, a second tie down and a third tie down connected to said wire respectively at one end, an intermediate point and the other end, said first and third tie downs being insulated from ground and said second tie down being grounded;

d.c. power supply means for supplying a d.c. current to said one and other ends of said wire;

driving means for driving said wire into an oscillatory motion of incremental angular translations including a first magnet having a gap with said wire extending through said gap, a second magnet being disposed orthogonal to said first magnet, said second magnet having a gap with said wire extending through said gap, first and second coils respectively surrounding portions of said first and second magnets;

control means for providing signals to said driving means that determine the direction of the incremental angular translations; and sensing means for detecting and measuring rotation by detecting the position of said wire and for providing a feedback to control said driving means including a first and second sensor disposed between said second and third tie downs at right angles to the axis of said wire with said first and second sensors separated by a predetermined angle, measuring means connected to said first and second sensors for measuring changes in direction, and feedback means connected to said first and second sensors for providing said feedback.

7. A vibrating wire attitude reference sensor according to claim 6 wherein said control means further comprises:

an a.c. power supply connected to said first coil;

divider means connected to said a.c. power supply for reducing the frequency of said a.c. power supply means; and gating means connected to said divider means and said feedback means for controlling the signal applied to said second coil.

* * * * *